(12) United States Patent
Ohori et al.

(10) Patent No.: US 10,524,322 B2
(45) Date of Patent: Dec. 31, 2019

(54) POWER SUPPLY, LAMP, AND VEHICLE

(71) Applicant: Panasonic Intellectual Property Management Co., Ltd., Osaka (JP)

(72) Inventors: Takahiro Ohori, Osaka (JP); Takahiro Fukui, Osaka (JP); Masanobu Murakami, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 130 days.

(21) Appl. No.: 15/935,039

(22) Filed: Mar. 25, 2018

(65) Prior Publication Data
US 2018/0288846 A1 Oct. 4, 2018

(30) Foreign Application Priority Data

Mar. 29, 2017 (JP) .................. 2017-065913

(51) Int. Cl.
*H05B 33/08* (2006.01)
*H02P 7/18* (2006.01)
*B60Q 1/14* (2006.01)

(52) U.S. Cl.
CPC ....... *H05B 33/0845* (2013.01); *B60Q 1/1415* (2013.01); *H02P 7/18* (2013.01); *H05B 33/0809* (2013.01)

(58) Field of Classification Search
CPC ............ H05B 33/0845; H05B 33/0809; H05B 33/08; B60Q 1/1415; B60Q 1/14; H02P 7/18
See application file for complete search history.

(56) References Cited

FOREIGN PATENT DOCUMENTS

JP       2014-60904 A    4/2014

*Primary Examiner* — Robert L Deberadinis
(74) *Attorney, Agent, or Firm* — Renner, Otto, Boisselle & Sklar, LLP

(57) ABSTRACT

In a power supply, a first output terminal and a second output terminal are electrically connected to each other, and a first common terminal and a second common terminal are electrically connected to each other. When a value of a consumption current of a motor is equal to or smaller than a value of a maximum output current of a second constant voltage circuit, the second constant voltage circuit keeps a second voltage at a steady voltage value. When the value of the consumption current of the motor is larger than the value of the maximum output current, the second constant voltage circuit control the second voltage to have a value smaller than a value of the first voltage, and a first constant voltage circuit supplies a differential current which corresponds to a difference between the consumption current of the motor and the maximum output current of the second constant voltage circuit.

16 Claims, 4 Drawing Sheets

POWER SUPPLY, LAMP, AND VEHICLE

CROSS-REFERENCE TO RELATED APPLICATIONS

The present application is based upon and claims the benefit of priority of Japanese Patent Application No. 2017-065913, filed on Mar. 29, 2017, the entire contents of which are incorporated herein by reference.

TECHNICAL FIELD

The disclosure relates to power supplies, lamps, and vehicles.

BACKGROUND ART

There has been provided a conventional power supply configured to turn on an illumination load. The power supply includes a DC-DC converter configured to convert an input DC (direct current) voltage into a DC voltage with a desired voltage value, and a controller configured to control the DC-DC converter. Recently, there is an increasing situation in that Light Emitting Diodes (LEDs) are employed as a light source of an illumination load because of their small consumption energy and long life.

The power supply may be provided with a cooling device such as a fan, for the purpose of dissipating the heat generated by the LEDs. For example, a power supply of JP2014-60904A (hereinafter, referred to as "Document 1") includes a DC-DC converter configured to drive LEDs and another DC-DC converter configured to drive a motor of a DC fan, and is configured to drive the DC-DC converters so as to turn the LEDs on while being cooled by the DC fan.

It is known that a load current required for activating a motor (referred to as "activation current") is generally larger than a load current required for rotating the motor (referred to as "steady current") at a constant rotation speed (for example, the activation current is about several to several tens of times larger than the steady current). In order to ensure the activation current, the power supply of Document 1 needs to include such a DC-DC converter for driving the DC fan that has a large maximum output current value (i.e., large output current range), leading to an increase in a size of the DC-DC converter for driving the DC fan.

SUMMARY

An object of the present disclosure is to reducing the overall size of a power supply, and providing a lamp and a vehicle including the power supply.

A power supply according to one aspect of the present disclosure includes a converter, a control circuit, a first constant voltage circuit, and a second constant voltage circuit. The converter is configured to supply a first load with a DC power. The control circuit is configured to control the converter. The first constant voltage circuit has a first output terminal serving as a high potential side and a first common terminal serving as a low potential side, and is configured to output a first voltage to the control circuit through the first output terminal and the first common terminal. The second constant voltage circuit has a second output terminal serving as a high potential side and a second common terminal serving as a low potential side, and is configured to output a second voltage to a second load through the second output terminal and the second common terminal. The first output terminal and the second output terminal are electrically connected to each other. The first common terminal and the second common terminal are electrically connected to each other. The second constant voltage circuit is configured to, when a value of a consumption current of the second load is equal to or smaller than a value of a maximum output current of the second constant voltage circuit, keep the second voltage at a steady voltage value. The second constant voltage circuit is further configured to, when the value of the consumption current of the second load is larger than the value of the maximum output current, control the second voltage to have a value smaller than a value of the first voltage. The first constant voltage circuit is configured to, when the value of the consumption current of the second load is larger than the value of the maximum output current, supply the control circuit with a differential current defined as a difference between the consumption current of the second load and the maximum output current while supplying the control circuit with a consumption current of the control circuit.

A power supply according to one aspect of the present disclosure includes a converter, a control circuit, a first constant voltage circuit, and a second constant voltage circuit. The converter is configured to supply a first load with a DC power. The control circuit is configured to control the converter. The first constant voltage circuit has a first output terminal serving as a high potential side and a first common terminal serving as a low potential side, and is configured to output a first voltage to the control circuit through the first output terminal and the first common terminal. The second constant voltage circuit has a second output terminal serving as a high potential side and a second common terminal serving as a low potential side, and is configured to output a second voltage to a second load through the second output terminal and the second common terminal. The first output terminal and the second output terminal are electrically connected to each other. The first common terminal and the second common terminal are electrically connected to each other. The first constant voltage circuit is configured to, when a value of a consumption current of the control circuit is equal to or smaller than a value of a maximum output current of the first constant voltage circuit, keep the first voltage at a steady voltage value. The first constant voltage circuit is further configured to, when the value of the consumption current of the control circuit is larger than the value of the maximum output current, control the first voltage to have a value smaller than a value of the second voltage. The second constant voltage circuit is configured to, when the value of the consumption current of the control circuit is larger than the value of the maximum output current, supply the control circuit with a differential current defined as a difference between the consumption current of the control circuit and the maximum output current while supplying the second load with a consumption current of the second load.

A lamp according to one aspect of the present disclosure includes the power supply of the above, an illumination load serving as the first load, and a lamp body to which the power supply is attached.

A vehicle according to one aspect of the present disclosure includes the lamp of the above, and a vehicle body on which the lamp is mounted.

DETAILED DESCRIPTION

An embodiment described hereinafter relates generally to a power supply, a lamp, and a vehicle. In particular, the embodiment relates to a power supply, a lamp, and a vehicle, including a first constant voltage circuit for driving a control circuit and a second constant voltage circuit for driving a second load.

Figure 1:
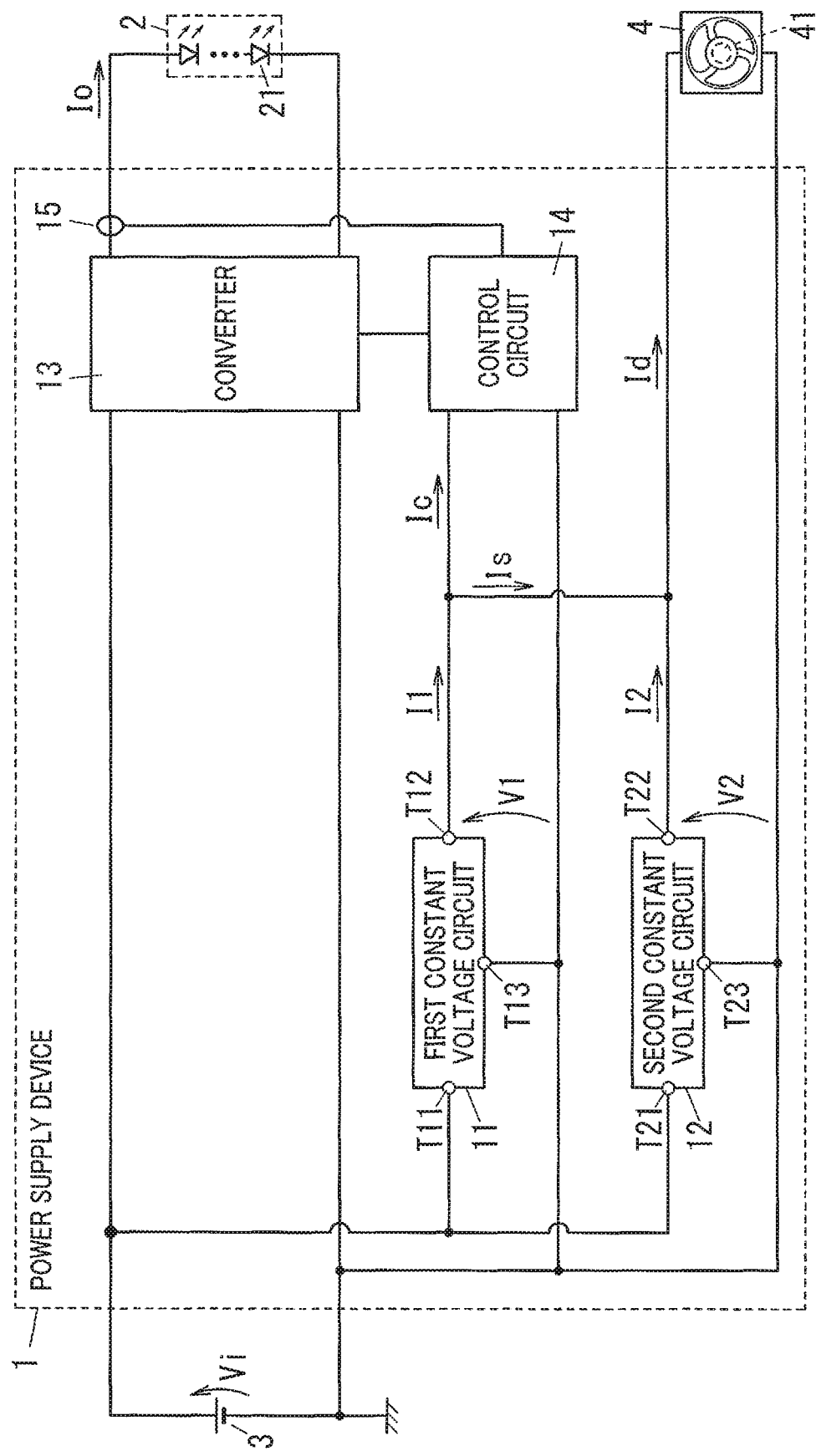
FIG. 1 is a block diagram illustrating a power supply according to an embodiment.

A power supply according to the embodiment will be described with reference to the drawings. FIG. 1 shows a configuration of a power supply 1 according to the embodiment.

The power supply 1 includes a constant voltage circuit 11, a constant voltage circuit 12, a converter 13, and a control circuit 14. Preferably, the power supply 1 further includes a current sensor 15.

The converter 13 is configured to supply an illumination load 2 with a DC power. The illumination load 2 includes a plurality of LEDs 21 as a light source, and server as a first load. The converter 13 is configured to receive a DC external power from an external power supply 3 such as a battery, and to supply the illumination load 2 with a DC load current Io (DC power) to turn on the illumination load 2. Luminance of the illumination load 2 can be adjusted to a desired luminance in accordance with an adjustment of the load current Io supplied from the converter 13.

The illumination load 2 includes the plurality of LEDs 21 electrically connected in series. Alternatively, the illumination load 2 may include two or more light source groups connected in parallel, each of the plurality of light source groups including LEDs 21 electrically connected in series.

The control circuit 14 is configure to control an operation of the converter 13 to turn on the illumination load 2, turn off the illumination load 2, and adjust the luminance of the illumination load 2 to a desired luminance. Specifically, the current sensor 15 is configured to measure the load current Io and to output, to the control circuit 14, a measurement signal indicative of a measured value of the load current Io. The control circuit 14 is configured to receive the measurement signal from the current sensor 15. Note that a current target value, as a target value of the load current Io, is preliminarily held on the control circuit 14. The control circuit 14 is configured to output, to the converter 13, a control signal for controlling the converter 13 so as to make the measured value of the load current Io approach the current target value. While the converter 13 operates in accordance with the control signal, the value of the load current Io approaches the current target value. The control circuit 14 controls the converter 13 as described above, and thus a value of the load current Io is kept to be the current target value.

The control circuit 14 includes a computer, for example. The computer includes a device including one or more processors for executing one or more programs, an interface device for sending and receiving signals to and from other devices, and a storing device for storing programs, data, and the like. The device with one or more processors may be a Central Processing Unit (CPU) or Micro Processing Unit (MPU) separated from the storing device, or a microcomputer incorporating a storing device therein. A storing device may be a storage device with short access time such as a semiconductor memory. Programs may be preliminarily stored in a recording medium such as a computer readable read only memory (ROM) or optical disk, or be sent to a recording medium through a wide area network such as the Internet. When the computer executes the program, the control circuit 14 controls the converter 13 as described herein.

The control circuit 14 may include a lighting control Integrated Circuit (IC) for the lighting control of a light source.

The constant voltage circuit 11 is a constant voltage power supply circuit for driving the control circuit 14, and serves as a first constant voltage circuit in the embodiment. Hereinafter, the constant voltage circuit 11 is referred to as a first constant voltage circuit 11. Note that in FIG. 1, the constant voltage circuit 11 is illustrated as the first constant voltage circuit 11. The first constant voltage circuit 11 includes a power supply IC incorporating a Low Drop Out (LDO) regulator for example, and is configured to perform a constant voltage control on its output. The first constant voltage circuit 11 includes a first input terminal T11, a first output terminal T12, and a first common terminal T13. The first input terminal T11 and the first common terminal T13 receives therethrough a DC input voltage Vi output from the external power supply 3. The first constant voltage circuit 11 is configured to convert the input voltage Vi into a DC first voltage V1 which is output through the first output terminal T12 and the first common terminal T13. A first current I1, defined as an output current of the first constant voltage circuit 11, is output through the first output terminal T12. Note that the first input terminal T11 serves as a high potential side, the first output terminal T12 serves as a high potential side, and the first common terminal T13 serves as a low potential side (e.g. ground).

The constant voltage circuit 12 is a constant voltage power supply circuit for driving a motor 41 of a DC fan 4, and serves as a second constant voltage circuit in the embodiment. Hereinafter, the constant voltage circuit 12 is referred to as a second constant voltage circuit 12. Note that in FIG. 1, the constant voltage circuit 12 is illustrated as the second constant voltage circuit 12. The second constant voltage circuit 12 includes a power supply IC incorporating an LDO regulator for example, and is configured to perform a constant voltage control on its output. The second constant voltage circuit 12 includes a second input terminal T21, a second output terminal T22, and a second common terminal T23. The second input terminal T21 and the second common terminal T23 receives therethrough the DC input voltage Vi (external power) output from the external power supply 3. The second constant voltage circuit 12 is configured to convert the input voltage Vi into a DC second voltage V2 and to output the second voltage V2 through the second output terminal T22 and the second common terminal T23. A second current I2, defined as an output current of the second constant voltage circuit 12, is output through the second output terminal T22. Note that the second input terminal T21 serves as a high potential side, the second output terminal T22 serves as a high potential side, and the second common terminal T23 serves as a low potential side (grounded).

The DC fan 4 includes the motor 41, where the motor 41 serves as a second load. The motor 41 receives the second voltage V2 to rotate. Fans of the DC fan 4 rotate according to the rotation of the motor 41 to cool the illumination load 2. Optionally, the DC fan 4 may be configured to cool the power supply 1 in addition to the illumination load 2.

It is noted that, in the power supply 1, the first output terminal T12 of the first constant voltage circuit 11 and the second output terminal T22 of the second constant voltage circuit 12 are electrically connected to each other. According to the power supply 1 with this configuration, one of outputs of the first constant voltage circuit 11 and the second constant voltage circuit 12 can be compensated by the other of them.

An operation of the power supply 1 will be described hereafter.

In the DC fan 4, a consumption current Id flows through the motor 41. A consumption current Id of the motor 41 for activating the motor 41 is larger than a consumption current Id of the motor 41 while the motor 41 operates under a normal operation. In general, the consumption current Id for the activation is about several to several tens of times larger than the consumption current Id for the normal operation.

A comparative example is considered here in which the first output terminal T12 and the second output terminal T22 are electrically disconnected from each other. In this case, the consumption current Id of the motor 41 should be supplied from the second constant voltage circuit 12 alone. In this case, therefore, the second constant voltage circuit 12 needs to be configured such that it can supply the consumption current Id required for the activation. Thus, a value of a maximum output current Im of the second constant voltage circuit 12 needs to be large, where the maximum output current value Im is defined as a maximum value of the second current I2 which can be supplied from the second constant voltage circuit 12. As a result, components (for example, the power supply IC incorporating the LDO regulator and the like) of the second constant voltage circuit 12 need to have comparatively large sizes.

In view of the above, in the power supply 1 of the embodiment, the first output terminal T12 of the first constant voltage circuit 11 and the second output terminal T22 of the second constant voltage circuit 12 are electrically connected to each other. With this configuration, both of the first constant voltage circuit 11 and the second constant voltage circuit 12 can supply currents to the motor 41 for securing the consumption current Id. Accordingly, the maximum output current value Im of the second constant voltage circuit 12 can be made small compared to the comparative example.

In the embodiment, the control circuit 14 has a rated value of an input voltage of 5 V. Thus, the first constant voltage circuit 11 is configured to perform a constant voltage control of keeping the first voltage V1 at 5 V. In the embodiment, the motor 41 has a rated value of an input voltage of 5 V. Thus, the second constant voltage circuit 12 is configured to perform a constant voltage control of keeping the second voltage V2 at 5 V.

That is, the steady voltage value of the second voltage V2 of the second constant voltage circuit 12 under the constant voltage control is the same as the steady voltage value of the first voltage V1 of the first constant voltage circuit 11 under the constant voltage control. Accordingly, in a steady state in which a value of the consumption current Id is equal to or smaller than the maximum output current value Im, the first current I1 output from the first constant voltage circuit 11 equals to a consumption current Ic input to the control circuit 14, and the second current I2 output from the second constant voltage circuit 12 equals to the consumption current Id input to the motor 41.

When a value of the consumption current Id increases and becomes larger than the maximum output current value Im, the second constant voltage circuit 12 comes into an overloaded state. Under the overloaded state of the second constant voltage circuit 12, if the value of the second voltage V2 of the second constant voltage circuit 12 is decreased to fall below the steady voltage value of the second voltage V2, the value of the first current I1 output from the first constant voltage circuit 11 increases to be larger than that in the steady state according to the decrease in the second voltage V2. Note that, as the amount of the decrease in the second voltage V2 increases, the first current I1 further increases. The increased amount of the first current I1 is supplied to the motor 41 to serve as a part of the consumption current Id.

Figure 2:
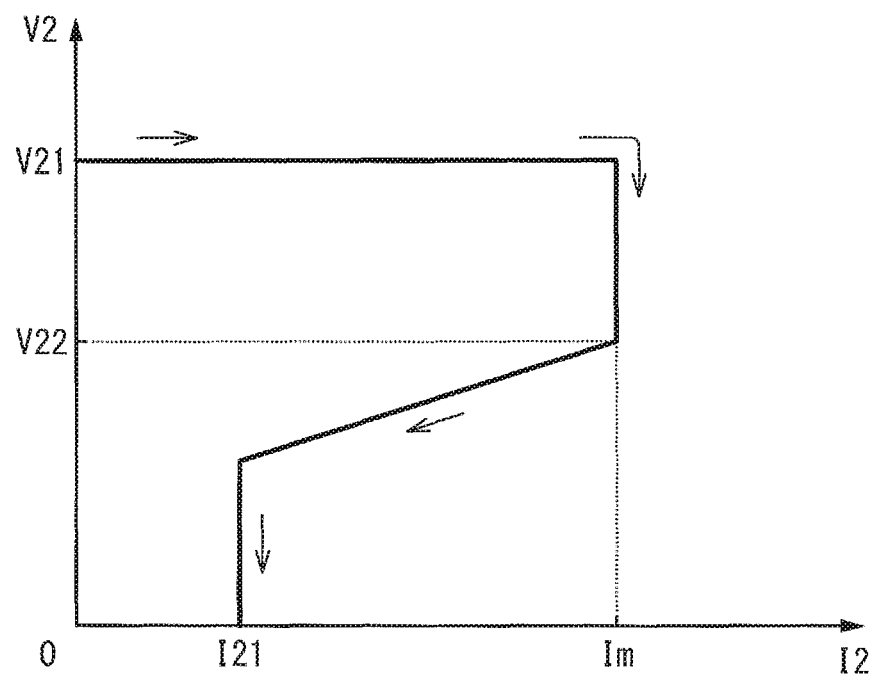
FIG. 2 is a diagram illustrating an I-V characteristic of a second constant voltage circuit provided in the power supply.

In view of the above, in the embodiment, the second constant voltage circuit 12 is configured such that a relationship between the second current I2 and the second voltage V2 follows the I-V characteristic shown in FIG. 2.

According to a decrease in an impedance of a load electrically connected between the second output terminal T22 and the second common terminal T23 of the second constant voltage circuit 12, from a state where the second current I2 is 0 A (equivalent to a state where the second output terminal T22 and the second common terminal T23 of the second constant voltage circuit 12 are disconnected), the value of the second current I2 increases from 0 A. In a section where the value of the second current I2 increases from 0 A to reach the maximum output current Value Im, the value of the second voltage V2 is kept at the steady voltage value V21 (5 V, in the embodiment) under the constant voltage control. According to a further decrease in the impedance of the load after the value of the second current I2 reaches the maximum output current value Im, the value of the second voltage V2 decreases from the steady voltage value V21 while the value of the second current I2 is kept at the maximum output current value Im. According to a further decrease in the impedance of the load after the value of the second voltage V2 decreases to reach a voltage value V22, each of the values of the second voltage V2 and the second current I2 decreases. According to a further decrease in the impedance of the load after the value of the second current I2 decreases to reach a current value I21, the second voltage V2 gradually decreases while the value of the second current I2 is kept at the current value I21.

With the second constant voltage circuit 12 configured such that the second current I2 and the second voltage V2 thereof follow the I-V characteristics shown in FIG. 2, the value of the second voltage V2 in the overloaded state is smaller than the value of the second voltage V2 in the steady state (steady voltage value V21). It should be noted that under a condition where the value of the second voltage V2 of the second constant voltage circuit 12 is smaller than the value of the first voltage V1 of the first constant voltage circuit 11, not only the second current I2 output from the second constant voltage circuit 12 but also a part of the first current I1 output from the first constant voltage circuit 11 is supplied to the motor 41. That is, under the overloaded state, a differential current Is (see FIG. 1) is compensated by the part of the first current I1. Note that the differential current Is is defined as a difference in current obtained by subtracting the maximum output current value Im from the value of the consumption current Id in the overloaded state (i.e., a shortfall above the maximum output current value Im of the second current I2).

In the embodiment, preferably, a rated value of the first current I1 of the first constant voltage circuit 11 is larger than a sum of a maximum value of the consumption current Ic of the control circuit 14 and a value of a maximum differential current (maximum shortfall current value). The value of the maximum differential current is defined as a value obtained by subtracting the maximum output current value Im from a maximum value of the consumption current Id of the motor 41. With this configuration, the first current I1 of the first constant voltage circuit 11 can cover the differential current Is which the second constant voltage circuit 12 cannot supply in addition to the consumption current Ic of the control circuit 14.

In the embodiment, the differential current Is of the consumption current Id of the motor 41, which the second constant voltage circuit 12 cannot supply, is supplied from the first constant voltage circuit 11. Therefore, the first constant voltage circuit 11 should have a capability for supplying the differential current Is in addition to the consumption current Ic of the control circuit 14. This may cause an increase in the rated value of the first current I1 of the first constant voltage circuit 11, possibly leading to an increase in the size of the first constant voltage circuit 11. It is therefore necessary to appropriately set a ratio of the value of the second current I2 supplied from the second constant voltage circuit 12 to the value of the differential current Is supplied from the first constant voltage circuit 11 within the maximum value of the consumption current Id of the motor 41. In other words, it should be taken into consideration how a ratio between the value of the differential current Is and the value of the second current I2 within the maximum value of the consumption current Id can reduce a total size of the first constant voltage circuit 11 and the second constant voltage circuit 12.

Figure 3:
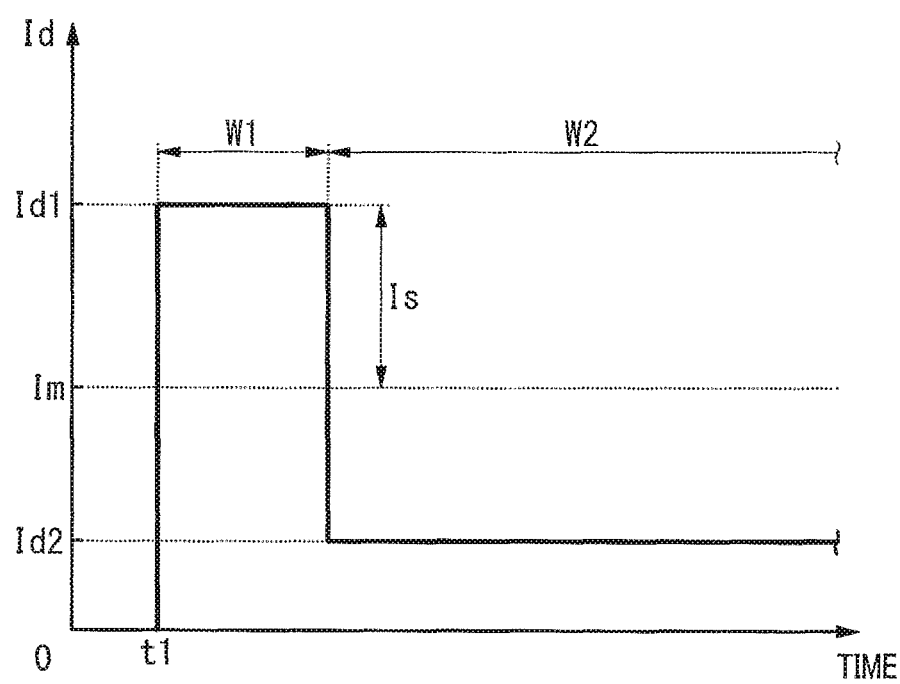
FIG. 3 is a waveform diagram illustrating a consumption current of a motor which serves as a second load.

In the embodiment, as shown in FIG. 3, when the motor 41 is activated (point in time t1), the value of the consumption current Id of the motor 41 increases rapidly right after the activation. In FIG. 3, the value of the consumption current Id increases to reach an overloaded current value Id1, which is larger than the maximum output current value Im, and the second constant voltage circuit 12 comes into the overloaded state. During an overloaded period W1 which is defined as a period in which the second constant voltage circuit 12 is in the overloaded state, the value of the second voltage V2 decreases from the steady voltage value V21 to fall below the value of the first voltage V1. As a result, part of the first current I1 of the first constant voltage circuit 11 is supplied to the motor 41 as the differential current Is. In short, in the overloaded period W1, a part, corresponding to the maximum output current value Im, of the consumption current Id is covered by the second current I2. Moreover, the differential current Is (difference obtained by subtracting the maximum output current value Im from the overloaded current value Id1) is covered by part of the first current I1.

The value of the consumption current Id increases to reach the overloaded current value Id1 right after the activation, and then decreases to a steady current value Id2 which is smaller than the maximum output current value Im, so that the second constant voltage circuit 12 comes into a steady state. During a steady state period W2 in which the second constant voltage circuit 12 is in the steady state, the value of the second voltage V2 is kept at the steady voltage value V21 under the constant voltage control. Accordingly, in the steady state period W2, the consumption current Id is covered by the second current I2 alone.

As described above, in the power supply 1, the second load (motor 41) can receive at least part of the consumption current Id from the first constant voltage circuit 11 as well as from the second constant voltage circuit 12, and thus the maximum output current value Im of the second constant voltage circuit 12 can be made small compared to that of the comparative example. As a result, components of the second constant voltage circuit 12 can be downsized compared to those of the comparative example, leading to the reduction in size of the second constant voltage circuit 12. Furthermore, the reduction in size of the components (for example, the power supply IC incorporating the LDO regulator) of the second constant voltage circuit 12 can offer an advantage of reduction in cost and reduction in a mounting area of circuits of the second constant voltage circuit 12.

Consequently, the power supply 1 including the first constant voltage circuit 11 for driving the control circuit 14 and the second constant voltage circuit 12 for driving the motor 41 (second load) can offer an advantage of the reduction in size of the second constant voltage circuit 12.

Preferably, at least one of the first input terminal T11 of the first constant voltage circuit 11 and the second input terminal T21 of the second constant voltage circuit 12 is electrically connected to the external power supply 3 to receive the DC input voltage Vi from the external power supply 3. In the embodiment, each of the first input terminal T11 and the second input terminal T21 is electrically connected to the external power supply 3 to receive the DC input voltage Vi therefrom.

With this configuration, no additional power supply other than the external power supply 3 is required for operating the first constant voltage circuit 11 and the second constant voltage circuit 12, leading to the simplification of the configuration.

Figure 4:
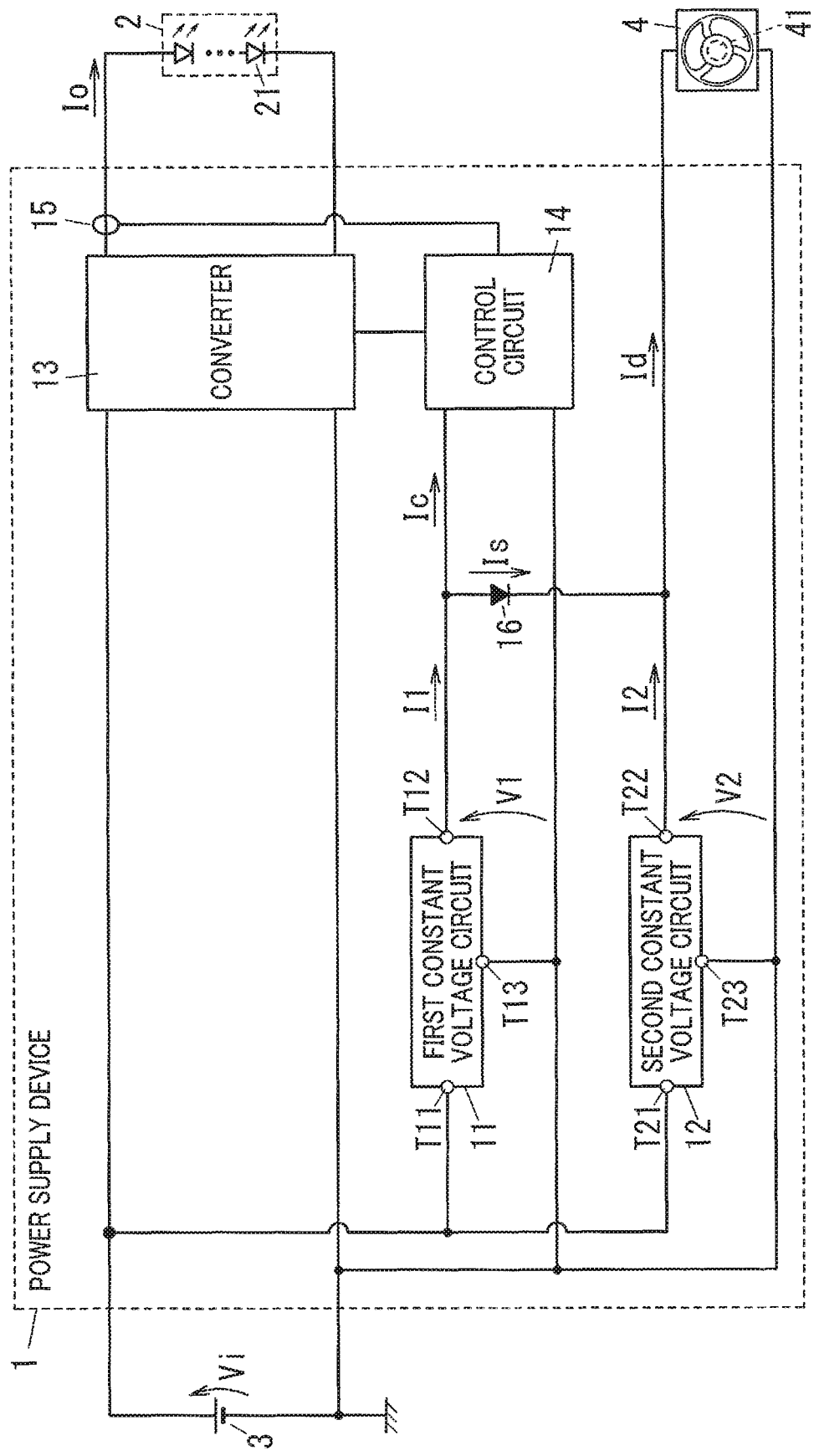
FIG. 4 is a block diagram illustrating a power supply according to a modification.

A modification of the power supply 1 will be described with reference to FIG. 4.

According to the modification, the power supply 1 further includes a diode 16. The diode 16 is interposed in an electric path electrically interconnecting the first output terminal T12 of the first constant voltage circuit 11 and the second output terminal T22 of the second constant voltage circuit 12. The diode 16 has an anode electrically connected to the first output terminal T12 and a cathode electrically connected to the second output terminal T22. That is, a forward direction of the diode 16 corresponds to a direction directing from the first output terminal T12 to the second output terminal T22.

In the modification, during the overloaded period W1, the value of the second voltage V2 decreases from the steady voltage value V21 so that the value of the second voltage V2 falls below the value of the first voltage V1, as explained in the embodiment. The diode 16 is thus biased in the forward direction to conduct between the anode and the cathode, to allow such that part of the first current I1 of the first constant voltage circuit 11 is supplied to the motor 41 as the differential current Is.

In contrast, when the value of the first voltage V1 decreases from the steady voltage value so that the value of the first voltage V1 falls below the value of the second voltage V2, the diode 16 is inversely biased to interrupt the electrical connection between the anode and the cathode. This inhibits a current from flowing in a direction from the second output terminal T22 of the second constant voltage circuit 12 to the first constant voltage circuit 11 and the control circuit 14, and as a result the occurrence of an undesired operation in the first constant voltage circuit 11 and the control circuit 14 can be suppressed.

In addition, according to the modification, it is possible to set the value of the second voltage V2 larger than the value of the first voltage V1. Accordingly, it is possible to use more kinds of device for the second load as a load of the second constant voltage circuit 12.

In an specific example, the value of the first voltage V1 of the first constant voltage circuit 11 under the constant voltage control may be set to 3.3 V and the value of the second voltage V2 (steady voltage value V21) of the second constant voltage circuit 12 under the constant voltage control may be set to 5.0 V. In this case, since the power supply 1 includes the diode 16, it is possible to inhibit a current from flowing from the second output terminal T22 of the second constant voltage circuit 12 to the first constant voltage circuit 11 and the control circuit 14 in the steady state of the second constant voltage circuit 12. Furthermore, since the power supply 1 includes the diode 16, it is possible to allow the differential current Is to flow from the first output terminal T12 of the first constant voltage circuit 11 to the motor 41 of the DC fan 4 in the overloaded state of the second constant voltage circuit 12.

In the modification, preferably, the diode 16 may be a Schottky diode having a small forward voltage.

The diode 16 may be a diode unit including two or more diodes connected in series.

Figure 5:
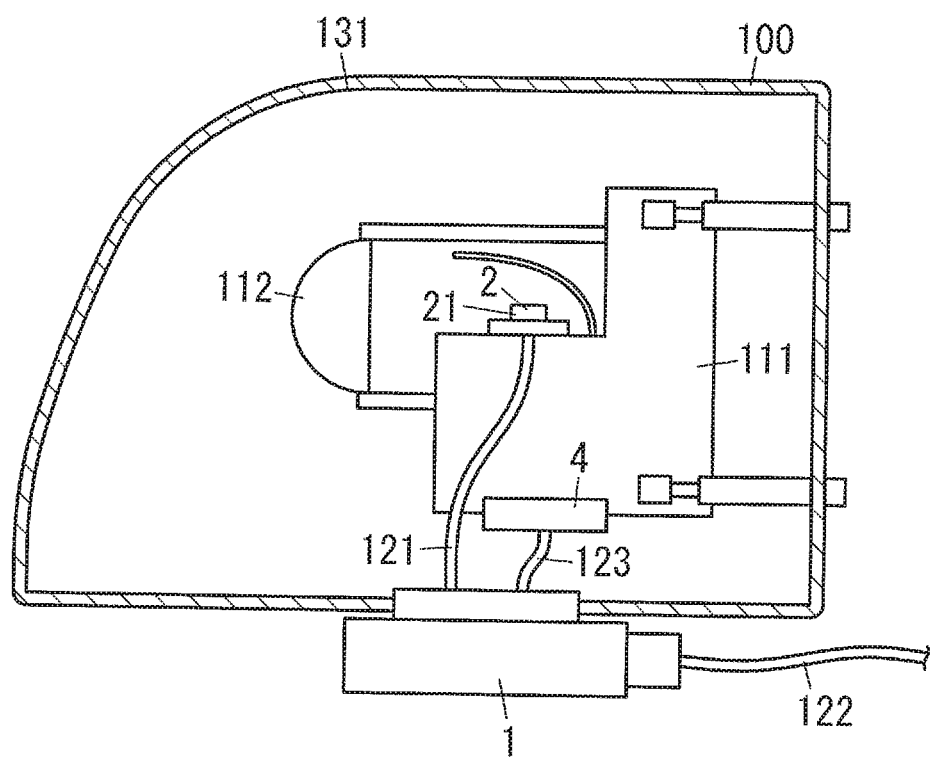
FIG. 5 is a cross sectional view of a lamp.

The power supply 1 according to the embodiment and the modification may be used as a lamp 100, such as a headlight of a vehicle. FIG. 5 shows a lamp 100 serving as a headlight.

The lamp 100 includes the power supply 1, the illumination load 2, the DC fan 4, a heat sink 111, an optical unit 112, and a lamp body 131 in which these components are housed. The illumination load 2 is mounted on the heat sink 111, and the heat generated in the illumination load 2 is radiated outward through the heat sink 111. The optical unit 112 includes for example a lens, a reflector and the like, and is disposed on a front side (left in FIG. 5) of the illumination load 2. Distribution of the light output from the illumination load 2 is controlled by the optical unit 112. The power supply 1 is disposed in a lower side of the lamp body 131, and operates with the power supplied from a vehicle battery serving as the external power supply 3. The DC fan 4 is attached to the heat sink 111. The blades of the DC fan 4 are rotated, thereby the head radiation amount of the heat sink 111 is increased. The DC fan 4 can increase the heat dissipation ability for the illumination load 2. The DC fan 4 may be configured to fan the heat sink 111 to cool down the illumination load 2 indirectly as shown in FIG. 5, or alternatively be configured to fan the illumination load 2 to cool down the illumination load 2 directly.

The power supply 1 and the illumination load 2 are electrically connected to each other with an output line 121, and the illumination load 2 is configured to receive a lighting power (load current Io) through the output line 121. The power supply 1 is configured to receive an external power (the DC input voltage Vi), through a power line 122, from the vehicle battery as the external power supply 3 provided on the vehicle.

The power supply 1 and the motor 41 of the DC fan 4 are electrically connected to each other with an output line 123, and the motor 41 is configured to receive a drive power (consumption current Id) through the output line 123.

Since the lamp 100 is provided, on the lamp body 131, with the power supply 1 described above, the second constant voltage circuit 12 can be downsized. As a result, the lamp 100 can be downsized.

The lamp 100 may function as a low-beam headlight or a high-beam headlight by selectively turning on or off some of the plurality of LEDs 21 of the illumination load 2.

Figure 6:
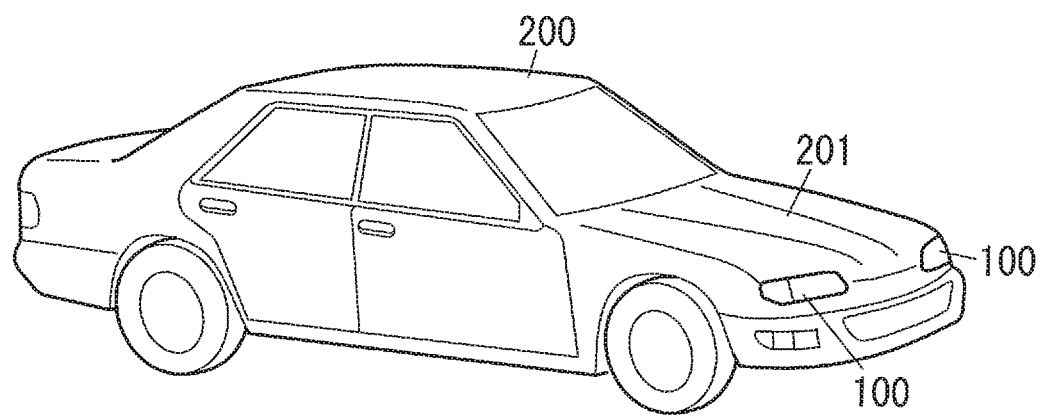
FIG. 6 is a perspective view of a part of a vehicle.

FIG. 6 is an external perspective view of a vehicle 200 provided with a pair of lamps 100 that serve as headlights on right and left sides. The pair of lamps 100 are mounted on a front side of a vehicle body 201 of the vehicle 200. The lamp 100 including the power supply 1 is not limited to be used as the headlight, but may be used as a blinker, a taillight and the like of the vehicle, or another lamp.

In the embodiment and the modification described above, the constant voltage circuit 11 serves as a first constant voltage circuit, the constant voltage circuit 12 serves as a second constant voltage circuit, and the motor 41 of the DC fan 4 which is a load of the constant voltage circuit 12 serves as a second load. Moreover, the first constant voltage circuit 11 supplies the motor 41 of the first constant voltage circuit 11 with the differential current Is in the overloaded state of the second constant voltage circuit 12.

In an alternative example, the first constant voltage circuit 11 may be configured such that a relationship between the first current I1 and the first voltage V1 follows the I-V characteristic shown in FIG. 2, and the value of the first voltage V1 during an overloaded state of the first constant voltage circuit 11 may be decreased compared to that in a the steady state (or be decreased to fall below the value of the second voltage V2). In this case, the first constant voltage circuit 11 operates in a similar manner as an operation of the second constant voltage circuit 12 described above with reference to FIG. 1 or FIG. 4, and the second constant voltage circuit 12 operates in a similar manner as an operation of the first constant voltage circuit 11 described above with reference to FIG. 1 or FIG. 4. Thus, the constant voltage circuit 12 supplies a differential current to the control circuit 14 during the overloaded state of the constant voltage circuit 11. In this case, the diode 16 may be interposed in the electric path electrically interconnecting the first output terminal T12 and the second output terminal T22 such that a forward direction of the diode 16 corresponds to a direction directing from the second output terminal T22 to the first output terminal T12.

In the embodiment and the modification described above, the control circuit 14 is configured to control the converter 13 so as to make the measured value of the load current Io approach the current target value. Alternatively, the control circuit 14 may be configured to control the converter 13 so as to make a measured value of an output voltage of the converter 13 approach a voltage target value.

The light source of the illumination load 2 is not limited to the LEDs 21. The illumination load 2 may include, as the light source, another solid-state light emitting device(s) such as one or more organic electro luminescence (OEL) devices, one or more laser diodes (LD), and the like.

In the embodiment and the modification described above, each of the first constant voltage circuit 11 and the second constant voltage circuit 12 includes the power supply IC incorporating the LDO regulator to perform a constant voltage control on its output. Alternatively, the first constant voltage circuit 11 and/or the second constant voltage circuit 12 may include a switching regulator including a switching control IC.

In the embodiment and the modification described above, the motor 41 of the DC fan 4 is used as a second load. However, the second load is not limited to the motor 41 of the DC fan 4, but may be a motor of another device. Alternatively, the second load may be a load other than the motor, as long as an inductive load or a capacitive load.

In the embodiment and the modification described above, the first constant voltage circuit 11 and the control circuit 14 are formed separately, but the first constant voltage circuit 11 and the control circuit 14 may be formed integrally.

In the embodiment and the modification described above, the power supply 1 includes two constant voltage circuits, namely the first constant voltage circuit 11 and the second constant voltage circuit 12. Alternatively, the power supply 1 may include three or more constant voltage circuits. In this case, the three or more constant voltage circuits may be configured to compensate consumption currents of their loads with one another.

Specific current waveform and specific voltage waveform are described in the embodiment, but the current waveform and/or the voltage waveform are not limited to those described above.

As described above, the power supply 1 of the first aspect derived from the embodiment includes the converter 13, the control circuit 14, the first constant voltage circuit 11, and the second constant voltage circuit 12. The converter 13 is configured to supply the first load (illumination load 2) with the DC power. The control circuit 14 is configured to control the converter 13. The first constant voltage circuit 11 has the first output terminal T12 serving as a high potential side and the first common terminal T13 serving as a low potential side, and is configured to output the first voltage V1 to the control circuit 14 through the first output terminal T12 and the first common terminal T13. The second constant voltage circuit 12 has the second output terminal T22 serving as a high potential side and the second common terminal T23 serving as a low potential side, and is configured to output the second voltage to the second load (motor 41 of DC fan 4) through the second output terminal T22 and the second common terminal T23. The first output terminal T12 and the second output terminal T22 are electrically connected to each other. The first common terminal T13 and the second common terminal T23 are electrically connected to each other. The second constant voltage circuit 12 is configured to, when the value of the consumption current Id of the second load is equal to or smaller than the maximum output current value Im of the second constant voltage circuit 12, keep the second voltage V2 at the steady voltage value. The second constant voltage circuit 12 further configured to, when the value of the consumption current Id of the second load is larger than the maximum output current value Im, control the second voltage to have a value smaller than the value of the first voltage V1. The first constant voltage circuit 11 is configured to, when the value of the consumption current Id of the second load is larger than the maximum output current value Im, supply the second load with the differential current (shortfall current) Is which corresponds to a difference between the consumption current Id of the second load and the maximum output current, while supplying the control circuit 14 with the consumption current Ic of the control circuit 14.

As described above, in the power supply 1, the second load can receive at least part of the consumption current Id from the first constant voltage circuit 11 as well as from the second constant voltage circuit 12, and thus the maximum output current value Im of the second constant voltage circuit 12 can be made small compared to that of the conventional one. As a result, components of the second constant voltage circuit 12 can be downsized compared to those of the conventional one, leading to the reduction in size of the second constant voltage circuit 12. Furthermore, the reduction in size of the components (for example, the power supply IC incorporating the LDO regulator) of the second constant voltage circuit 12 can offer an advantage of reduction in cost and reduction in a mounting area of circuits of the second constant voltage circuit 12.

Consequently, it is possible to reduce the overall size of the power supply 1.

Further, the power supply 1 of the second aspect which would be realized in combination with the first aspect further includes the second load. The second load may preferably be an inductive load or a capacitive load.

Further, in the power supply 1 of the third aspect which would be realized in combination with the second aspect, the second load may preferably be the motor 41.

In this case, the power supply 1 can supply the inrush current occurring at the activation of the motor 41 by use of the second constant voltage circuit 12 having a reduced size.

Further, in the power supply 1 of the fourth aspect which would be realized in combination with any one of the first to third aspects, the steady voltage value of the second voltage V2 may preferably be equal to or larger than the value of the first voltage V1.

In this case, it is possible to use more kinds of device for the second load as a load of the second constant voltage circuit 12.

Further, the power supply 1 of the fifth aspect which would be realized in combination with any one of the first to fourth aspects may further include the diode 16 which is disposed either: between the first output terminal T12 and the second output terminal T22; or between the first common terminal T13 and the second common terminal T23, preferably. The diode 16 has the forward direction so as to allow the differential current Is to flow from the first constant voltage circuit 11 to the second constant voltage circuit 12.

In this case, the current does not flow in a direction from the second output terminal T22 of the second constant voltage circuit 12 to the first constant voltage circuit 11 and the control circuit 14, and as a result the occurrence of an undesired operation in the first constant voltage circuit 11 and the control circuit 14 can be suppressed.

Further, in the power supply 1 of the sixth aspect which would be realized in combination with the fifth aspect, the diode 16 may preferably be disposed between the first output terminal T12 and the second output terminal T22.

Further, in the power supply 1 of the seventh aspect which would be realized in combination with the sixth aspect, the value of the first voltage V1 may preferably be smaller than the steady voltage value of the second voltage V2.

Further, in the power supply 1 of the eighth aspect which would be realized in combination with any one of the fifth to seventh aspects, the diode 16 may preferably be a diode unit including two or more diodes connected in series.

Further, in the power supply 1 of the ninth aspect which would be realized in combination with any one of the fifth to seventh aspects, the diode 16 may preferably be a Schottky diode.

Further, in the power supply 1 of the tenth aspect which would be realized in combination with any one of the first to ninth aspects, the converter 13 may preferably be configured to receive the external power from the external power supply 3 to convert the external power into the DC power. At least one of the first constant voltage circuit 11 and the second constant voltage circuit 12 may preferably be configured to receive the external power.

In this case, no additional power supply other than the external power supply 3 is required for operating the first constant voltage circuit 11 and the second constant voltage circuit 12, leading to the simplification of the configuration.

Further, in the power supply 1 of the eleventh aspect which would be realized in combination with the tenth aspect, each of the first constant voltage circuit 11 and the second constant voltage circuit 12 is configured to receive the external power.

Further, in the power supply 1 of the twelfth aspect which would be realized in combination with any one of the first to eleventh aspects, the first constant voltage circuit 11 may preferably have a rated value of an output current (first current I1) which is larger than a sum of the maximum value of the consumption current Ic of the control circuit 14 and the value of the maximum differential current. The value of the maximum differential current may preferably be the value obtained by subtracting the maximum output current value Im from the maximum value of the consumption current Id of the second load.

In this case, the first current I1 of the first constant voltage circuit 11 can cover the differential current Is which the second constant voltage circuit 12 cannot supply in addition to the consumption current Ic of the control circuit 14.

Further, the power supply 1 of the thirteenth aspect includes the converter 13, the control circuit 14, the first constant voltage circuit 11, and the second constant voltage circuit 14. The converter 13 is configured to supply the first load (illumination load 2) with the DC power. The control circuit 14 is configured to control the converter 13. The first constant voltage circuit 11 has the first output terminal T12 serving as a high potential side and the first common terminal T13 serving as a low potential side, and is configured to output the first voltage V1 to the control circuit 14 through the first output terminal T12 and the first common terminal T13. The second constant voltage circuit 12 has the second output terminal T22 serving as a high potential side and the second common terminal T23 serving as a low potential side, and is configured to output the second voltage V2 to the second load (motor 41 of DC fan 4) through the second output terminal T22 and the second common terminal T23. The first output terminal T12 and the second output terminal T22 are electrically connected to each other. The first common terminal T13 and the second common terminal T23 are electrically connected to each other. The first constant voltage circuit 11 is configured to, when the value of the consumption current Ic of the control circuit 14 is equal to or smaller than the value of the maximum output current of the first constant voltage circuit 11, keep the first voltage V1 at the steady voltage value. The first constant voltage circuit 11 is further configured to, when the value of the consumption current Ic of the control circuit 14 is larger than the value of the maximum output current, control the first voltage V1 to have the value smaller than the value of the second voltage V2. The second constant voltage circuit 12 is configured to, when the value of the consumption current Ic of the control circuit 14 is larger than the value of the maximum output current, supply the control circuit 14 with the differential current defined as a difference between the consumption current Ic of the control circuit 14 and the maximum output current while supplying the second load with the consumption current Id of the second load.

Further, the lamp 100 of the fourteenth aspect may preferably include the power supply of any one of the first to thirteenth aspects, the illumination load 2 serving as the first load, and the lamp body 131 to which the power supply 1 is attached.

The lamp 100 includes the power supply 1. Accordingly, it is possible to reduce the size of the second constant voltage circuit 12 of the lamp 100, leading to the reduction in size of the lamp 100.

Further, the vehicle 200 of the fifteenth aspect may preferably include the lamp 100 of the fourteenth aspect, and the vehicle body 201 on which the lamp 100 is mounted.

The vehicle 200 includes the lamp 100. Accordingly, it is possible to reduce the size of the lamp 100 of the vehicle 200, leading to the reduction in the mounting space of the lamp 100.

Further, in the vehicle 200 of the sixteenth aspect which would be realized in combination with the fifteenth aspect, the lamp 100 may preferably be configured to serve as a headlight.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A power supply comprising:
    a converter configured to supply a first load with a DC power;
    a control circuit configured to control the converter;
    a first constant voltage circuit which has a first output terminal serving as a high potential side and a first common terminal serving as a low potential side, and is configured to output a first voltage to the control circuit through the first output terminal and the first common terminal; and
    a second constant voltage circuit which has a second output terminal serving as a high potential side and a second common terminal serving as a low potential side, and is configured to output a second voltage to a second load through the second output terminal and the second common terminal,
    the first output terminal and the second output terminal being electrically connected to each other,
    the first common terminal and the second common terminal being electrically connected to each other,
    the second constant voltage circuit being configured to,
        when a value of a consumption current of the second load is equal to or smaller than a value of a maximum output current of the second constant voltage circuit, keep the second voltage at a steady voltage value, and
        when the value of the consumption current of the second load is larger than the value of the maximum output current, allow the second voltage to have a value smaller than a value of the first voltage, and
    the first constant voltage circuit being configured to, when the value of the consumption current of the second load is larger than the value of the maximum output current, supply the second load with a differential current which corresponds to a difference between the consumption current of the second load and the maximum output current, while supplying the control circuit with a consumption current of the control circuit.

2. The power supply of claim 1, further includes the second load, wherein
    the second load is an inductive load or a capacitive load.

3. The power supply of claim 2, wherein
    the second load is a motor.

4. The power supply of claim 1, wherein
    the steady voltage value of the second voltage is equal to or larger than a value of the first voltage.

5. The power supply of claim 1, further comprising a diode which is disposed either: between the first output terminal and the second output terminal; or between the first common terminal and the second common terminal, such that the diode has a forward direction so as to allow the differential current to flow from the first constant voltage circuit to the second constant voltage circuit.

6. The power supply of claim 5, wherein
the diode is disposed between the first output terminal and the second output terminal.

7. The power supply of claim 6, wherein
a value of the first voltage is smaller than the steady voltage value of the second voltage.

8. The power supply of claim 5, wherein
the diode is a diode unit including two or more diodes connected in series.

9. The power supply of claim 5, wherein
the diode is a Schottky diode.

10. The power supply of claim 1, wherein
the converter is configured to receive an external power from an external power supply to convert the external power into the DC power, and
at least one of the first constant voltage circuit and the second constant voltage circuit is configured to receive the external power.

11. The power supply of claim 10, wherein
each of the first constant voltage circuit and the second constant voltage circuit is configured to receive the external power.

12. The power supply of claim 1, further includes the second load, wherein
the first constant voltage circuit has a rated value of an output current which is larger than a sum of a maximum value of the consumption current of the control circuit and a value of a maximum differential current, the value of the maximum differential current being a value obtained by subtracting the value of the maximum output current from a maximum value of the consumption current of the second load.

13. A power supply, comprising:
a converter configured to supply a first load with a DC power;
a control circuit configured to control the converter;
a first constant voltage circuit which has a first output terminal serving as a high potential side and a first common terminal serving as a low potential side, and is configured to output a first voltage to the control circuit through the first output terminal and the first common terminal; and
a second constant voltage circuit which has a second output terminal serving as a high potential side and a second common terminal serving as a low potential side, and is configured to output a second voltage to a second load through the second output terminal and the second common terminal,
the first output terminal and the second output terminal being electrically connected to each other,
the first common terminal and the second common terminal being electrically connected to each other,
the first constant voltage circuit being configured to,
when a value of a consumption current of the control circuit is equal to or smaller than a value of a maximum output current of the first constant voltage circuit, keep the first voltage at a steady voltage value, and
when the value of the consumption current of the control circuit is larger than the value of the maximum output current, control the first voltage to have a value smaller than a value of the second voltage, and
the second constant voltage circuit being configured to,
when the value of the consumption current of the control circuit is larger than the value of the maximum output current, supply the control circuit with a differential current defined as a difference between the consumption current of the control circuit and the maximum output current while supplying the second load with a consumption current of the second load.

14. A lamp, comprising:
the power supply of claim 1;
an illumination load serving as the first load; and
a lamp body to which the power supply is attached.

15. A vehicle, comprising:
the lamp of claim 14; and
a vehicle body on which the lamp is mounted.

16. The vehicle of claim 15, wherein
the lamp is configured to serve as a headlight.

* * * * *